US008339975B2

(12) United States Patent
Salem et al.

(10) Patent No.: US 8,339,975 B2
(45) Date of Patent: Dec. 25, 2012

(54) APPARATUS AND METHOD FOR ALLOCATING SUBCHANNELS AND CONTROLLING INTERFERENCE IN OFDMA SYSTEMS

(75) Inventors: Mohamed Rashad Salem, Ottawa (CA); Abdulkareem Adinoiyi, Ottawa (CA); Mahmudur Rahman, Nepean (CA); Halim Yanikomeroglu, Ottawa (CA); David Falconer, Nepean (CA); Young-Doo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 12/341,933

(22) Filed: Dec. 22, 2008

(65) Prior Publication Data

US 2009/0310478 A1    Dec. 17, 2009

(30) Foreign Application Priority Data

Jun. 11, 2008    (KR) .................. 10-2008-0054726

(51) Int. Cl.
*H04L 1/00* (2006.01)
(52) U.S. Cl. ................................ 370/252; 370/208
(58) Field of Classification Search .............. 370/208, 370/252
See application file for complete search history.

(56) References Cited

U.S. PATENT DOCUMENTS

| 2004/0228288 | A1* | 11/2004 | Seol et al. | 370/252 |
|---|---|---|---|---|
| 2005/0111476 | A1* | 5/2005 | Gu | 370/441 |
| 2005/0232183 | A1 | 10/2005 | Sartori | |
| 2007/0104087 | A1* | 5/2007 | Tee et al. | 370/208 |
| 2008/0240030 | A1* | 10/2008 | Kolding et al. | 370/329 |
| 2008/0273541 | A1* | 11/2008 | Pharn | 370/400 |
| 2009/0110087 | A1* | 4/2009 | Liu et al. | 375/260 |
| 2009/0213805 | A1* | 8/2009 | Zhang et al. | 370/329 |
| 2009/0285109 | A1* | 11/2009 | Chin et al. | 370/252 |
| 2009/0316809 | A1* | 12/2009 | Chun et al. | 375/260 |
| 2010/0034148 | A1* | 2/2010 | Zhang et al. | 370/328 |
| 2010/0130223 | A1* | 5/2010 | Liao et al. | 455/453 |

FOREIGN PATENT DOCUMENTS

| EP | 1788740 A1 | 5/2007 |
|---|---|---|
| EP | 1806945 A2 | 7/2007 |
| JP | 2003-229896 | 8/2003 |
| JP | 2007-068092 | 3/2007 |
| KR | 2006-057471 | 5/2006 |
| KR | 2007-038875 | 4/2007 |
| KR | 2007-062757 | 6/2007 |
| KR | 10-2007-0082284 A | 8/2007 |
| KR | 2007-117140 | 12/2007 |
| WO | WO 2006/098608 A1 | 9/2006 |

OTHER PUBLICATIONS

Parag, Parimal, et al., "A subcarrier Allocation Algorithm for OFDMA using Buffer and Channel State Information", 2005 IEEE 62nd Vehicular Technology Conference, Sep. 2005, pp. 622-625.
International Preliminary Report on Patentability (including Written opinion of the International Searching Authority) issued Oct. 4, 2011, in counterpart International Application No. PCT/KR2009/002119 (7 pages).

* cited by examiner

*Primary Examiner* — Mark Rinehart
*Assistant Examiner* — Christopher R Crompton
(74) *Attorney, Agent, or Firm* — NSIP Law

(57) ABSTRACT

Provided is an apparatus for controlling interference. The apparatus may receive interference information about at least one subchannel which is allocated to at least one node in an OFDMA system. The apparatus may create an interference list using the interference information. The apparatus may report the interference list to a radio network controller (RNC)."

14 Claims, 8 Drawing Sheets

Table I

US 8,339,975 B2

APPARATUS AND METHOD FOR ALLOCATING SUBCHANNELS AND CONTROLLING INTERFERENCE IN OFDMA SYSTEMS

CROSS-REFERENCE TO RELATED APPLICATION

This application claims the benefit under 35 U.S.C. §119(a) of a Korean Patent Application No. 10-2008-0054726, filed Jun. 11, 2008, in the Korean Intellectual Property Office, the entire disclosure of which is incorporated herein by reference.

TECHNICAL FIELD

The following description relates to Orthogonal Frequency Division Multiple Access (OFDMA) systems. More particularly, the description relates to an apparatus and method for allocating subchannels and controlling interference in an OFDMA systems.

BACKGROUND

Currently, expansion of a cell radius is expected in a mobile communication system since throughput is increased or services are provided to terminals outside a cell radius by reducing path loss occurring between a base station and a terminal via relay nodes installed within the cell radius.

Interference occurs in such mobile communication systems due to a plurality of nodes in the cell which cause traffic, including traffic of a base station. Also, overhead may occur when transmitting data packets due to the plurality of nodes. Such overhead may be overcome by recycling channels between cells. However, if cell interference occurs while channels are recycled between cells, users located at the edge of the cell radius may experience inferior conditions due to resource allocation.

SUMMARY

In one general aspect, an apparatus for allocating subchannels includes: a subchannel allocation coefficient determination unit to determine a subchannel allocation coefficient using a queue length of at least one terminal and a signal to interference plus noise ratio (SINR) of the at least one terminal and at least one relay station in an Orthogonal Frequency Division Multiple Access (OFDMA) system and a subchannel allocation unit to allocate a subchannel to at least one link formed in the OFDMA system using the subchannel allocation coefficient.

The at least one node may be at least one terminal in the OFDMA system. The determination unit may determine the threshold by estimating a total sum of actual data rates of the at least one terminal in a present frame using an actual data rate of the at least one terminal from a previous frame.

The subchannel allocation coefficient determination unit may determine the subchannel allocation coefficient for each of the at least one link based on the subchannels, where the subchannel allocation coefficient may be proportional to the queue length, and a data rate is calculated using the SINR.

The subchannel allocation unit may allocate a subchannel to each of the at least one link so that a total sum of the subchannel allocation coefficients of each of the at least one link, where the subchannel is allocated, is a maximum.

The subchannel allocation unit may select a link whose subchannel allocation coefficient is a maximum derived from links formed between a base station and the at least one terminal, and formed between the base station and the at least one relay station, for each subchannel; and the at least one relay station selects a link whose subchannel allocation coefficient is a maximum derived from links formed between the at least one relay station and the at least one terminal, for each subchannel.

The subchannel allocation unit may allocate a subchannel to each of the at least one link using the selected links so that a total sum of the subchannel allocation coefficients is a maximum.

The apparatus for allocating the subchannel also may be included in a base station in the OFDMA system.

In another general aspect, an apparatus for controlling interference may include: an interference information receiving unit to receive interference information about at least one subchannel which is allocated to at least one node in an OFDMA system; a determination unit to determine whether a data rate of the at least one node is greater than a threshold; an interference list creating unit to create an interference list using the interference information when the data rate is not greater than the threshold; and a reporting unit to report the interference list to a radio network controller (RNC), wherein the RNC receives the interference list; creates a base station list and a relay station list to limit data transmission for each subchannel allocated to the OFDMA system; and transmits the base station list and relay station list to at least one base station in the OFDMA system.

The at least one node may transmit the interference information to the apparatus for controlling interference after generating a predetermined number of interference information for each subchannel that is set in an order of greatest interference power.

The at least one node may be at least one terminal in the OFDMA system, and the determination unit determines the threshold by estimating a total sum of actual data rates of the at least one terminal in a present frame using an actual data rate of the at least one terminal from a previous frame.

The at least one node may be at least one relay station in the OFDMA system, and the determination unit determines whether a total sum of the data rates of first hop of the at least one relay station is greater than the threshold.

The determination unit may determine the sum of the data rates of a second hop of the at least one relay station to be the threshold.

The data rate of the at least one node may be greater than the threshold and the interference list creating unit, limits an interference of each subchannel in the order of greatest interference power; determines whether the data rate of the at least one node is greater than the threshold; and creates the interference list using the interference information about the limited interference of each subchannel.

The data rate of the at least one node may be greater than the threshold and the interference creating unit limits the interference of each subchannel in the order of the greatest interference power and the reporting unit transmits the data rate of the at least one node and transmits the interference list.

The RNC may create for each subchannel the base station list and the relay station list using the interference list and the data rate of the at least one node.

The apparatus for controlling interference may be included in the at least one base station in the OFDMA system.

In another general aspect, a method for allocating subchannels includes: determining a subchannel allocation coefficient using a queue length of at least one terminal and SINR of the at least one terminal and at least one relay station in an OFDMA system; and allocating a subchannel to at least one link formed in the OFDMA system using the subchannel allocation coefficient.

In another general aspect, a method for allocating subchannels includes: receiving interference information about at least one subchannel which is allocated to at least one node, from the at least one node in an OFDMA system; determining whether a data rate of the at least one node is greater than a threshold; making an interference list using the interference information when the data rate is not greater than the threshold; and transmitting the interference list to an RNC, wherein the RNC receives the interference list, creates a base station list and a relay station list to limit data transmission for each subchannel allocated to the OFDMA system, and transmits the base station list and relay station list to the at least one base station in the OFDMA.

In another general aspect, a computer-readable storage medium storing a program may be used to implement the above method.

In another general aspect, a computer-readable storage medium storing a program may also be used to implement the above method.

In addition, all data rates of the OFDMA system may be a maximum.

Other features will be apparent from the description, the drawings, and the claims.

BRIEF DESCRIPTION OF THE DRAWINGS

Like reference symbols in the various drawings indicate like elements.

DETAILED DESCRIPTION

The following detailed description is provided to assist the reader in gaining a comprehensive understanding of the various apparatuses and methods described herein. Accordingly, various changes, modifications, and equivalents of the apparatuses and methods described herein will be suggested to those of ordinary skill in the art. A method of allocating resources which can improve throughput by minimizing interference between cells or interference within cells when a plurality of relay nodes are installed is described below. In particular, an OFDMA scheme has been introduced in a next generation mobile communication system and a method of allocating resources considering the OFDMA is described below. Also, fairness for users is considered in view of resource allocation.

Figure 1:
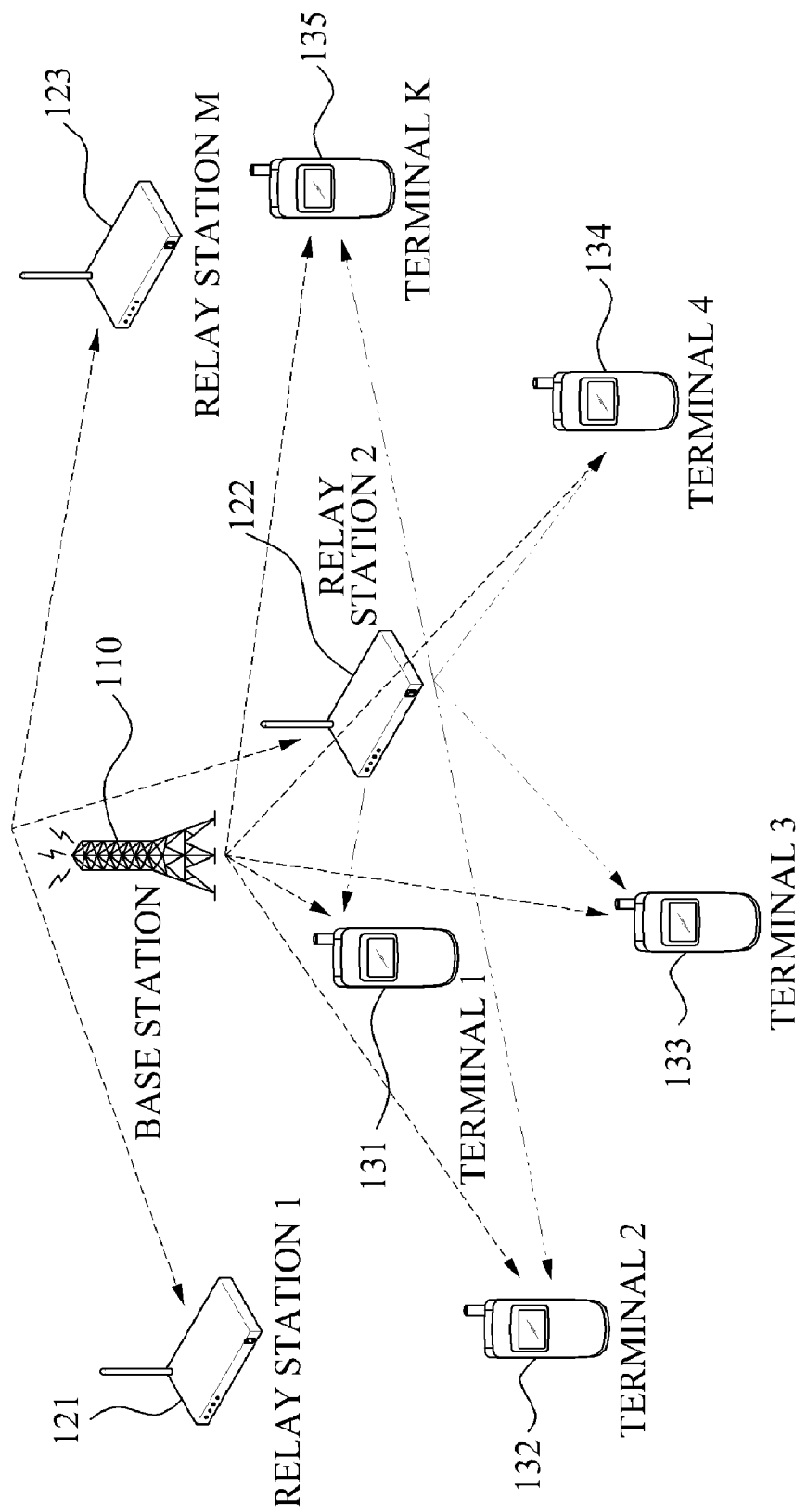
FIG. 1 is a diagram illustrating an exemplary communication network.

FIG. 1 is a diagram illustrating an exemplary Orthogonal Frequency Division Multiple Access (OFDMA) system. Referring to FIG. 1, the exemplary OFDMA system includes a base station 110; at least one relay station 121, 122, and 123; and at least one terminal 131, 132, 133, 134, and 135. It is assumed that there exists M number of the at least one relay station 121, 122, and 123 and K number of the at least one terminal 131, 132, 133, 134, and 135 in the exemplary OFDMA system. A total number of links, where subchannels can be allocated, are M(1+K)+K since K links exist between the base station 110 and the at least one terminal 131, 132, 133, 134, and 135; M links exist between the base station 110 and the at least one relay station 121, 122, and 123; and MK links exist between the at least one relay station 121, 122, and 123 and the at least one terminal 131, 132, 133, 134, and 135. A subchannel is respectively allocated to each of the links. Before the apparatus for allocating subchannels allocates the subchannels to the links, the apparatus determines a subchannel allocation coefficient using a queue length of the at least one terminal 131, 132, 133, 134, and 135 and a signal to interference plus noise ratio (SINR) of the at least one relay station 121, 122, and 123 and the at least one terminal 131, 132, 133, 134, and 135.

For example, the base station 110 and the at least one relay station 121, 122, and 123 may store the queue length information of the at least one terminal 131, 132, 133, 134, and 135. Accordingly, the apparatus for allocating subchannels may continuously update the queue length information of the at least one terminal 131, 132, 133, 134, and 135 by obtaining the queue length information of the at least one terminal 131, 132, 133, 134, and 135 from the base station and the at least one relay station 121, 122, and 123.

In another example, the apparatus for allocating subchannels may obtain SINR information from the at least one relay station 121, 122, and 123 and the at least one terminal 131, 132, 133, 134, and 135. In addition, the apparatus for allocating subchannels may be included in the base station 110. The base station 110 may also have the queue length information and the SINR information.

In another example, the apparatus for allocating subchannels may determine the subchannel allocation coefficient for each of the M(1+K)+K number of links based on all subchannels, where the subchannel allocation coefficient is proportional to the queue length, and a data rate is calculated using the SINR. In this example, the data rate may be calculated using:

$$R = W\log_2\left(1 + \frac{-1.5\beta}{\ln(5BER)}\right) \quad \text{[Equation 1]}$$

where β is a received SINR value, and W indicates a bandwidth.

A subchannel allocation coefficient corresponding to an nth subchannel in a link formed between the base station and the terminal may be represented by:

$$D_{n,0-k} = R_{0,k,n} \cdot Q_k^0(t) \quad \text{[Equation 2]}$$

where n indicates an nth subchannel, 0 indicates a base station, and k indicates a kth terminal. $R_{0,k,n}$ indicates a data rate between the base station and the kth terminal in the nth subchannel, and $Q_k^0(t)$ indicates a queue length of the kth terminal between the base station and the kth terminal.

A subchannel allocation coefficient corresponding to the nth subchannel in the link formed between the base station and the relay station, may be represented by:

$$D_{n,0-m} = R_{0,m,n} \max_{k} \{Q_k^0(t) - Q_k^m(t), 0\} \quad \text{[Equation 3]}$$

where n indicates an nth subchannel, 0 indicates a base station, m indicates an mth relay station, and k indicates a kth terminal. $R_{0,m,n}$ indicates a data rate of an mth relay station between the base station and the mth relay station in the nth subchannel, and $$\max_{k} \{Q_k^0(t) - Q_k^m(t), 0\}$$

indicates a queue length which is calculated by deducting a queue length of the kth terminal between the mth relay station and the kth terminal from a queue length of the kth terminal between the base station and the kth terminal. If a queue length is a negative number, a subchannel allocation coefficient between the base station and the mth relay station is zero.

In a link formed between the relay station and the terminal, a subchannel allocation coefficient corresponding to the nth subchannel may be represented by:

$$D_{n,m} = R_{m,k,n} \cdot Q_k^m(t) \quad \text{[Equation 4]}$$

where n indicates an nth subchannel, m indicates an mth relay station, and k indicates a kth terminal. $R_{m,k,n}$ indicates a data rate of the kth terminal between the mth relay station and the kth terminal in nth subchannel, and $Q_k^m(t)$ indicates a queue length of the kth terminal between the mth relay station and the kth terminal.

The apparatus for allocating subchannels may allocate subchannels to links formed in the OFDMA system once the subchannel allocation coefficient is determined using Equations 1 through 4.

The apparatus for allocating subchannels may also allocate a subchannel to each of the at least one link so that a total sum of the subchannel allocation coefficients is a maximum when subchannels are allocated to the at least one link, which may be represented by:

$$\max_{\rho,\gamma} \sum_{n=1}^{N} \left\{ \sum_{m=0}^{M} \sum_{k=1}^{K} \rho_{m,k,n} R_{m,k,n} Q_k^m(t) + \sum_{m=1}^{M} \sum_{k=1}^{K} \gamma_{0,m,n} R_{0,m,n} \max[Q_k^0(t) - Q_k^m(t), 0] \right\} \quad \text{[Equation 5]}$$

where $\rho_{m,k,n}$ and $\gamma_{0,m,n}$ are indicator variables and have features as described below:

$$\rho_{m,k,n} \in \{0, 1\} \forall\, m, k, n \quad \text{[Equation 6]}$$
$$\gamma_{0,m,n} \in \{0, 1\} \forall\, m, n$$
$$\sum_{m=0}^{M} \sum_{k=1}^{K} \rho_{m,k,n} + \sum_{m=1}^{M} \gamma_{0,m,n} \leq 1 \forall\, n.$$

Referring to Equation 5, a single subchannel is allocated to each of the links in the OFDMA system; however, a total sum of subchannel allocation coefficients that changes depending on a subchannel in each link are compared, and a combination of a subchannel and a link whose total sum is a maximum, is determined. Since a number of links in the OFDMA system in this example is M(1+K)+K, when a number of a subchannel is N, a number of cases that subchannels may be allocated to a link is $N^P M(1+K)+K$. Therefore, the apparatus for allocating subchannels may allocate a subchannel to a link to satisfy Equation 5 by comparing the combination of the subchannel and the link as many times as $N^P M(1+K)+K$. Also, the apparatus for allocating subchannels may allocate a subchannel to a link using another method instead of the above described method. For example, an apparatus for allocating subchannels may select a link whose subchannel allocation coefficient (which may be calculated for each link) is a maximum, from among K links formed between the base station 110 and the at least one terminal (e.g., 131, 132, 133, 134, and 135) and an M link formed between the base station 110 and the at least one relay station (e.g., 121, 122, and 123). In this example, the at least one relay station 121, 122, and 123 selects a link whose subchannel allocation coefficient is a maximum, from among the K links formed between the at least one relay station 121, 122, and 123 and the at least one terminal 131, 132, 133, 134, and 135. Consequently, the apparatus for allocating subchannels may allocate a subchannel to a link using the selected links.

An operation to select a link whose subchannel allocation coefficient (which may be calculated for each link) is a maximum, from among the K links between the base station 110 and the at least one terminal (e.g., 131, 132, 133, 134, and 135) and the M links between the base station 110 and the at least one relay station (e.g., 121, 122, and 123), may be represented by:

$$D_{n,0-k} = (R_{0,k,n} \cdot Q_k^0(t)), D_{n,0-m} \quad \text{[Equation 7]}$$
$$= R_{0,m,n} \max_{k} \{Q_k^0(t) - Q_k^m(t), 0\} \rightarrow D_{n,0}$$
$$= \max_{j \in \{M \cup K\}} D_{n,0-j}.$$

An operation to select a link whose subchannel allocation coefficient is a maximum, from among the K links formed between the at least one relay station (e.g., 121, 122, 123) and the at least one terminal (e.g., 131, 132, 133, 134, and 135), may be represented by:

$$D_{n,m} = \max_{k} \lfloor R_{m,k,n} \cdot Q_k^m(t) \rfloor. \quad \text{[Equation 8]}$$

Figure 2:
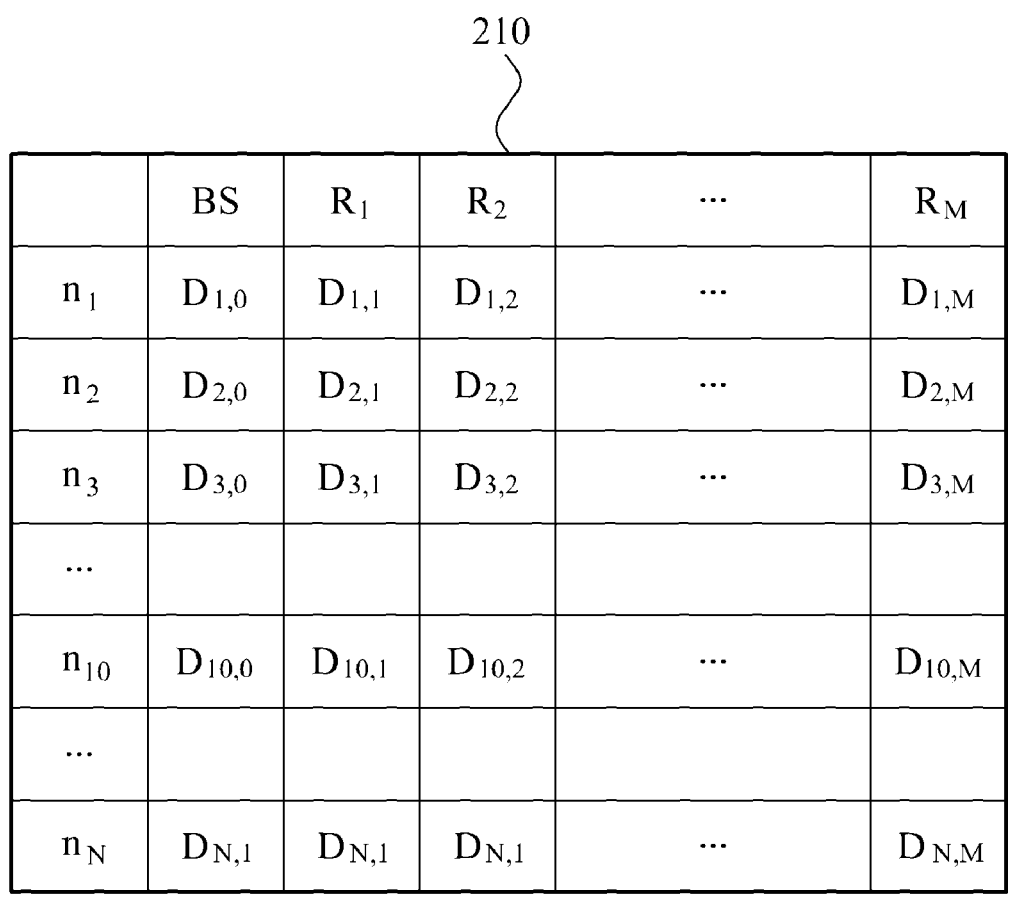
FIG. 2 is a table illustrating an exemplary list of subchannels that may be allocated.

As described above, an exemplary list of selected links and subchannels is illustrated in Table I 210 of FIG. 2. Hereinafter, examples of allocating a subchannel to a link will be described with reference to FIG. 2.

FIG. 2 is a table illustrating an exemplary list of subchannels that may be allocated. Referring to Table 1210, the first column listing "$n_1$ through $n_N$" represents a plurality of subchannels; the second column, labeled "BS," represents a base station 110; and the remaining columns, labeled $R_1$ through $R_M$, each represent at least one relay station 121, 122, and 123. That is, in this example, the terms $R_1$ through $R_M$ do not represent a data rate, but instead are used to represent a first receiver 121, a second receiver 122, etc. Also, $D_{NM}$ represents a subchannel allocation coefficient. Subchannel allocation coefficients of links selected according to Equation 7 are shown in the column labeled "BS" and subchannel allocation coefficients of links selected according to Equation 8 are shown for each column labeled $R_1$ to an $R_M$.

In one implementation, An apparatus for allocating subchannels may allocate a subchannel to a link so that a total sum of subchannel allocation coefficients of links, where a subchannel is allocated, is a maximum from among links selected using Equations 7 and 8. Referring to Table I 210, since a single subchannel is allocated to each link formed in the OFDMA system, a single link may be selected for each subchannel in the columns. Therefore, under this condition, links are selected so that a total sum of subchannel allocation coefficients of the selected links is a maximum, consequently a corresponding subchannel is allocated to the selected link.

Figure 3:
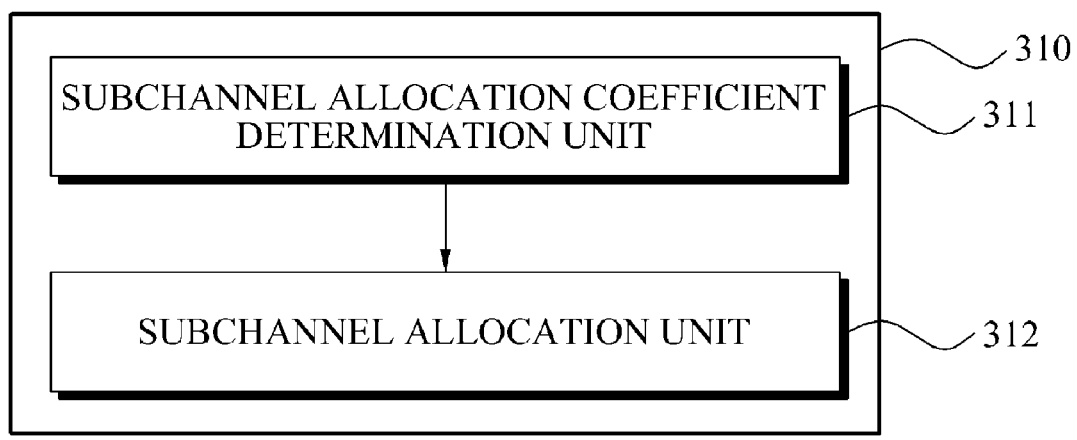
FIG. 3 is a diagram illustrating an exemplary apparatus for allocating subchannels.

FIG. 3 is a diagram illustrating an exemplary apparatus 310 for allocating subchannels. Referring to FIG. 3, the apparatus 310 for allocating subchannels may include a subchannel allocation coefficient determination unit 311 and a subchannel allocation unit 312. The subchannel allocation coefficient determination unit 311 determines a subchannel allocation coefficient using a queue length of at least one terminal existing in an OFDMA system and an SINR of the at least one terminal and at least one relay station. The subchannel allocation coefficient determination unit 311 may determine the subchannel allocation coefficient, the subchannel allocation coefficient is proportional to the queue length and a data rate is calculated using the SINR. That is, using Equations 1 through 4, the subchannel allocation coefficient may be determined.

The subchannel allocation unit 312 allocates a subchannel to at least one single link formed in the OFDMA system using the subchannel allocation coefficient determined in the subchannel allocation coefficient determination unit 311. The subchannel allocation unit 312 may allocate the subchannel to the at least one link so that a total sum of subchannel allocation coefficients of links, where subchannel is allocated, using Equations 5 and 6. The subchannel allocation unit 312 may select, for each subchannel, a link whose subchannel allocation coefficient is a maximum from among links formed between the base station 110 and the at least one terminal. In this example, the relay station may select, for each subchannel, a link whose subchannel allocation coefficient is a maximum from links formed between the relay station and the at least one terminal, using Equation 8. The subchannel allocation unit 312 may also allocate the subchannel to a link using the selected links so that a total sum of subchannel allocation coefficients of links, where the subchannel is allocated, is a maximum. The apparatus 310 for allocating subchannels may be included in the base station.

Figure 4:
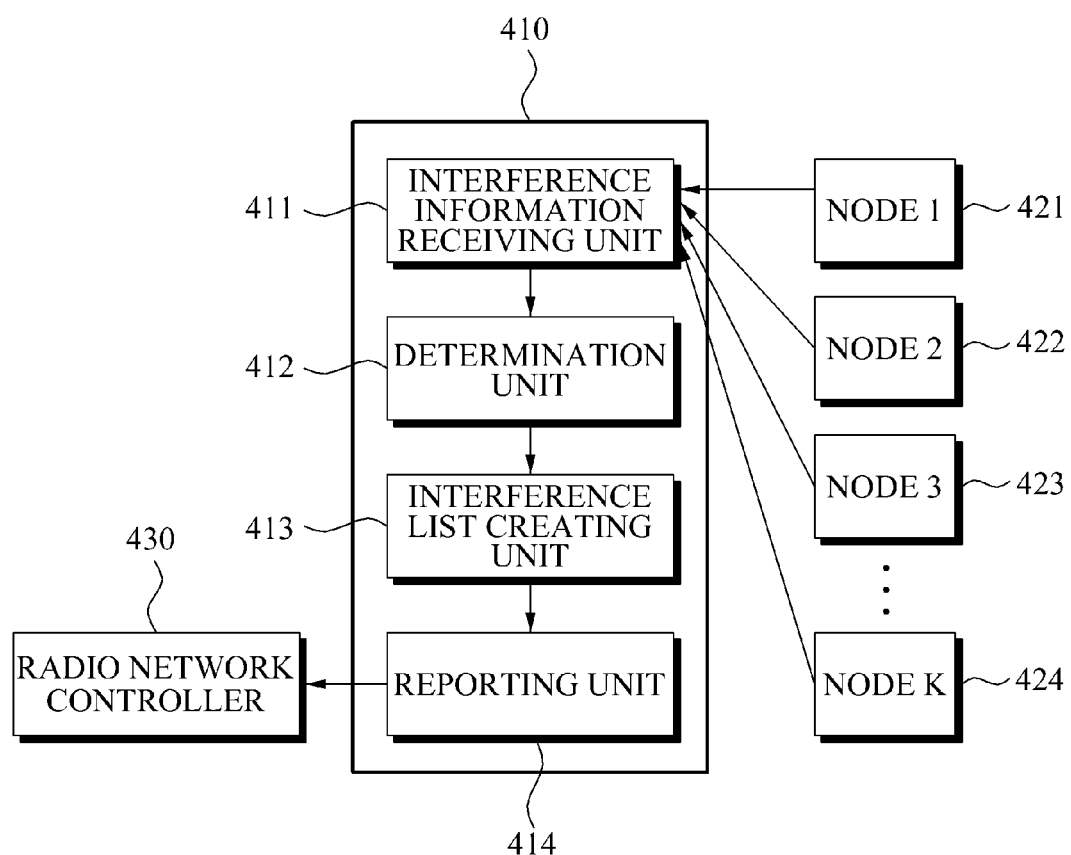
FIG. 4 is a diagram illustrating an exemplary apparatus for controlling interference.

FIG. 4 is a diagram illustrating an apparatus 410 for controlling interference. Referring to FIG. 4, the apparatus 410 for controlling interference, at least one node 421, 422, 423, and 424, and a radio network controller 430 are illustrated. The apparatus may include, for example, an interference information receiving unit 411, a determination unit 412, an interference list creating unit 413, and reporting unit 414. In addition, the apparatus for controlling interference may be included in a base station, for example, base station 110 illustrated in FIG. 1.

The interference information receiving unit 411 receives, from at least one node 421, 422, 423, and 424, interference information regarding at least one subchannel which is allocated to at least one node 421, 422, 423, and 424. The at least one node 421, 422, 423, and 424 may generate a predetermined number of interference information for each subchannel, which is allocated to each node, set in an order of greatest interference power, and may transmit the interference information to the apparatus 410 for controlling interference. As an example, when a predetermined number is six, the at least one node 421, 422, 423, and 424 may generate six pieces of interference information for each subchannel in an order of greatest interference power, and may transmit the generated six pieces of interference information to the apparatus 410 for controlling interference.

The determination unit 412 determines whether a data rate of the at least one node 421, 422, 423, and 424 is greater than a threshold. The at least one node 421, 422, 423, and 424 may be at least one terminal distributed in the OFDMA system. For example, the determination unit 412 may determine the threshold by estimating a total sum of actual data rates of the at least one terminal 421, 422, 423, and 424 in a present frame using an actual data rate of the at least one terminal from a previous frame, which is described in detail below.

A total sum of actual data rates of the at least one terminal 421, 422, 423, and 424 in a previous frame is calculated using a total sum of an actual data rate from the previous frame of the at least one terminal 421, 422, 423, and 424 as below:

$$r_{tot}(t-1) = \sum_{k=1}^{K} r_k(t-1). \quad \text{[Equation 9]}$$

In this example, it is assumed that a number of the at least one terminal is K.

By using the total sum of data rates of the at least one terminal 421, 422, 423, and 424 in the previous frame which is calculated via Equation 9, the total sum of data rates of the at least one terminal 421, 422, 423, and 424 in a present frame may be estimated via Equation 10 as below:

$$\tilde{r}_{tot}(t)=(1-w)\tilde{r}_{tot}(t-1)+wr_{tot}(t-1), \tilde{r}_{tot}(0)=0 \quad \text{[Equation 10]}$$

where 0<w<1.

By using the total sum of data rates of the at least one terminal 421, 422, 423, and 424 in the present frame which is estimate via Equation 10, an average cumulative virtual data rate may be obtained, which may be calculated via Equation 11 as below:

$$v(t) = v(t-1) + \frac{\tilde{r}_{tot}(t)}{K}, v(0) = 0. \quad \text{[Equation 11]}$$

Also, a cumulative actual data rate of a kth terminal from among the at least one terminal 421, 422, 423, and 424 may be represented by:

$$s_k(t)=s_k(t-1)+r_k(t), s_k(0)=0. \quad \text{[Equation 12]}$$

The determination unit 412 may determine whether the cumulative actual data rate of the kth terminal, which can be calculated via Equation 12, is greater than a threshold by having the average cumulative virtual data rate which can be calculated via Equation 11 to be the threshold. Equation 13 below shows whether a cumulative actual data rate is greater than the threshold is determined by having 95% of an average cumulative virtual data rate of the terminal to be the threshold.

$$r_k(t)+s_k(t-1) \geq 0.95v(t). \quad \text{[Equation 13]}$$

A threshold which is to be compared with the data rate of the rth terminal may be determined by deducting $s_k(t-1)$ from each of left and right terms in Equation 13, which may be represented by:

$$r_k(t) \geq 0.95v(t) - s_k(t-1) = r_k^{th}(t). \quad \text{[Equation 14]}$$

Consequently, referring to Equation 14, the threshold determined in the determination unit 412 is $0.95v(t)-s_k(t-1)$.

In the above example, it has been assumed that the at least one node 421, 422, 423, and 424 is a terminal, however it is possible that the at least one node 421, 422, 423, and 424 may be the at least one relay station existing in the OFDMA system. For example, the determination unit 412 may determine whether a total sum of data rates of first hops of the at least one relay station 421, 422, 423, and 424 is greater than a threshold. Also, the determination unit 412 may determine a total sum of data rates of second hops of the at least one relay station 421, 422, 423, and 424.

The interference list creating unit 413 creates an interference list using an interference list received in the interference information receiving unit 411 once the determination unit 412 has determined the data rate of the at least one node 421, 422, 423, and 424 is not greater than the threshold. The interference list creating unit 413 may limit the interference of each subchannel, allocated to each node of the at least one node 421, 422, 423, and 424, in an order of greatest interference power, and may determine whether the data rates of the at least one node 421, 422, 423, and 424 is greater than the threshold. When the data rates of the at least one node 421, 422, 423, and 424 are greater than the threshold, the interference list creating unit 413 creates the interference list using the interference information about the limited interference. As an example, it is assumed the interference information receiving unit 411 receives six pieces of interference information for each subchannel from the kth terminal where three subchannels are allocated, and each piece of interference information is $In_1$, $In_2$, $In_3$, $In_4$, $In_5$, $In_6$. (n: subchannel, interference power: $In_1 > In_2 > In_3 > In_4 > In_5 > In_6$). As a result of that interference list creating unit 413 limits the interference for each subchannel in an order of greatest interference power, when a data rate of the kth terminal is greater than the threshold since $I_{11}$ and $I_{12}$ are limited in the first subchannel, when the data rate of the kth terminal is greater than the threshold since $I_{21}$ is limited in the second terminal, and when the data rate of the kth terminal is greater than the threshold since $I_{31}$ is limited in the third terminal, the interference list creating unit 413 creates an interference list for each subchannel using $I_{11}$, $I_{12}$, $I_{21}$, and $I_{31}$.

The reporting unit 414 transmits the interference list created in the interference list creating unit 413 to the radio network controller 430. The interference list creating unit 413 may limit the interference in the order of greatest interference power, and the reporting unit 414 may transmit that the interference list created by determining whether a data rate at the time of the limiting is greater than the threshold and the data rate value to the radio network controller 430.

The radio network controller 430 creates, using the interference list received from the apparatus for controlling interference, a base station list and a relay station list to limit data transmission for each subchannel, allocated to the OFDMA system, and also transmits the base station list and relay station list to at least one base station in the OFDMA system.

When the radio network controller 430 receives the interference list and the data rate from the apparatus for controlling interference, and the base station list and the relay station list to limit data transmission using the received interference list and the data rate are created so that all data rates in the OFDMA system become a maximum for each subchannel allocated to the OFDMA system, the interference list and the data rate being created by limiting the interference in the order of greatest interference power. This may be described by Equation 15.

$$\max_x Z = \sum_i x_i R_i \prod_{j \neq i, j \in C_i} (1-x_j) \quad \text{[Equation 15]}$$

$$\text{s.t.} \quad x_1, x_2, \ldots x_{N_c} \in \{0, 1\}$$

Equation 15 represents selecting a base station and a relay station to limit data transmission for each subchannel allocated to the OFDMA system. $R_i$ indicates a data rate which can be obtained in an ith cell in the case that a base station and a relay station in a jth cell are limited; x is an indicator to determine whether to limit signal transmission of a base station or a relay station in each cell. When x=1, signal transmission is not limited, and when x=0, signal transmission is limited.

Hereinafter, the operations of the radio network controller 430 according to Equation 15 will be described by taking an example of a case of an nth subchannel. It is assumed, the radio network controller 430 receives a data rate when interference is limited and the interference list from the apparatus for controlling interference is in the first cell; the received data rate and the received interference list are analyzed when signal transmission of the base station is limited or when the relay station in the second cell and the third cell is limited; and an estimated data transmission rate in the first cell is $R_1$. It is also assumed that the radio network controller 430 receives a data rate when interference is limited and the interference list from the apparatus for controlling interference is in the second cell; that the received data rate and the received interference list are analyzed when signal transmission of the base station or the relay station in the first cell is limited; and an estimated data transmission rate in the second cell is $R_2$. It is also assumed that the radio network controller 430 receives a data rate when interference is limited and the interference list from the apparatus for controlling interference is in the third cell; the received data rate and the received interference list are analyzed when signal transmission of either the base station or the relay station is in the first cell is limited; and an estimated data transmission rate in the third cell is $R_3$. This may be represented by:

$${}_x^{max}Z = x_1(1-x_2)(1-x_3)R_1 + x_2(1-x_1)R_2 + x_3(1-x_1)R_3 s.t.x_1,$$
$$x_2, x_3 \in 0.1 \quad \text{[Equation 16]}$$

The radio network controller 430 selects a base station or a relay station to limit data transmission for each subchannel from among base stations and relay stations in the OFDMA system by obtaining $x_1$, $x_2$, and $x_3$ satisfying Equation 16, thereby creating an interference list. For example, if Z in Equation 16 is a maximum when $x_1=0$, $x_2=1$, $x_3=1$ are satisfied, the radio network controller 430 has a base station or a relay station in the first cell; either the a base station list or a relay station list may limit data transmission; and the radio network controller 430 may transmit the base station list or the relay station list to a plurality of base stations in the OFDMA system.

Figure 5:
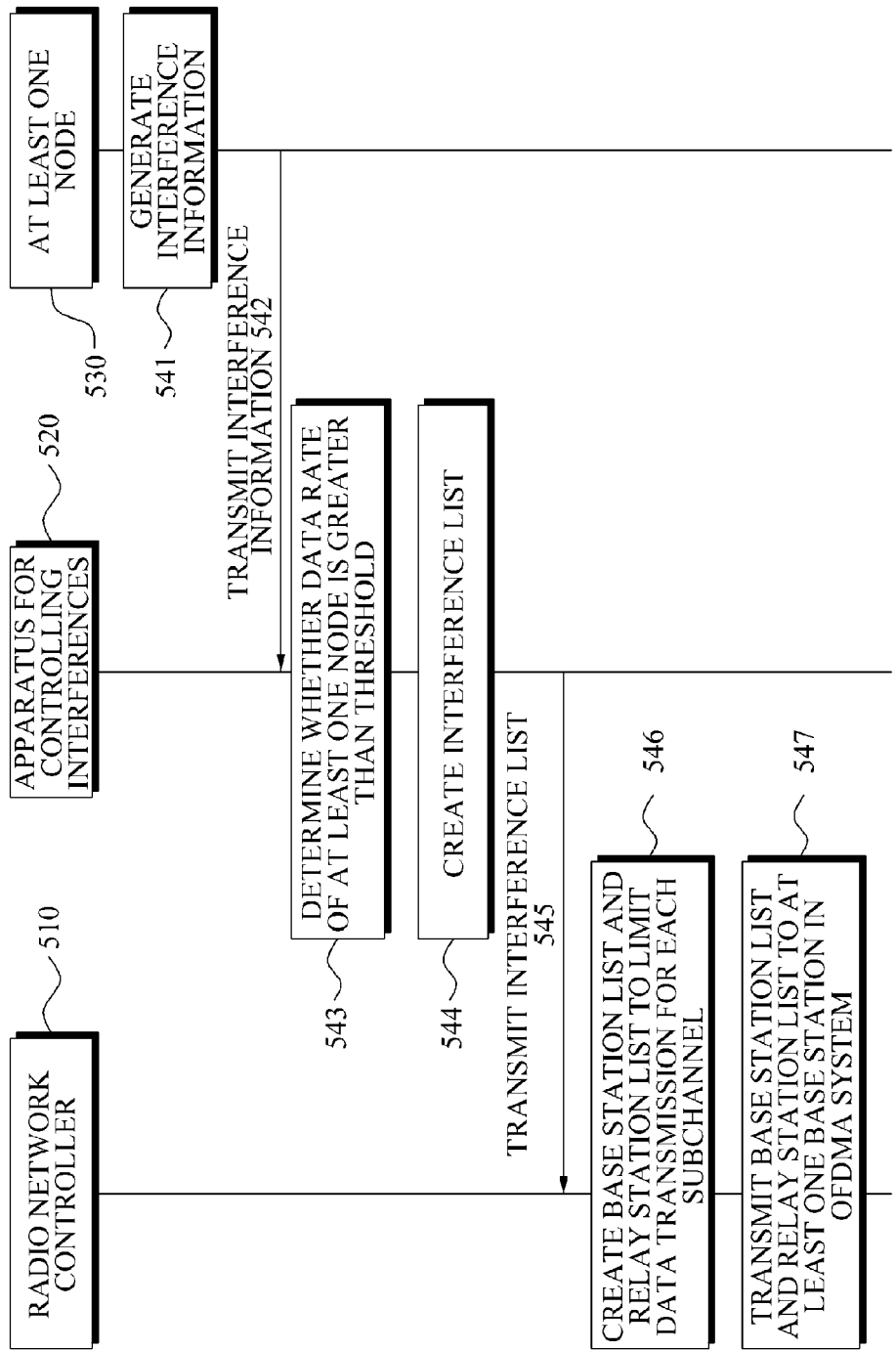
FIG. 5 is a flowchart illustrating exemplary operations of an exemplary apparatus for controlling interference.

FIG. 5 is a flowchart illustrating exemplary operations of an exemplary apparatus for controlling interference. Referring to FIG. 5, a radio network controller 510, an apparatus for controlling interference 520, and at least one node 530 are illustrated. In 541, the at least one node 530 generates interference information for at least one subchannel, allocated to the at least one node 530.

For example, the at least one node 530 may generate a predetermined number of interference information for each subchannel, set in an order of greatest interference power. In operation 542, the generated interference information is transmitted to the apparatus 520 for controlling interference. In operation 543, the apparatus 520 for controlling interference determines whether a data rate of the at least one node 530 is greater than a threshold. For example, the at least one node 530 may be a terminal and determining whether a data rate of the at least one terminal 530 is greater than the threshold may be determined using Equations 9 through 14.

Also, as an example, the at least one node 530 may be a relay station and a total sum of data rates of a first hop of the at least one relay station 530 is greater than total sum of data rates of a second hop of the at least one relay station 530 may be determined.

In operation 544, as a result of the determination in operation 543, when the data rate of the at least one node 530 is not greater than the threshold, the apparatus 520 for controlling interference creates an interference list using the interference information. In operation 545, the interference list created in the operation 544 is transmitted to the radio network controller 510. The apparatus 520 for controlling the interference limits the interference of each subchannel, allocated to the at least one node 530, in the order of greatest interference power, and determines whether the data rates of the at least one node 530 is greater than the threshold, and, when the data rates of the at least one node 530 is greater than the threshold, creates the interference list using the interference information about the limited interference, consequently may transmit the data rate which can be obtained by limiting the interference, and the interference list to the radio network controller 510. In operation 546, by using the interference list received by the radio network controller 510 in operation 545, a base station list and a relay station list to limit data transmission for each subchannel, allocated to the OFDMA system, are created from among at least one base station and relay station in the OFDMA system.

As an example, the radio network controller 510, via Equation 15, may create the base station list and relay station list to limit data transmission so that a total sum of data rates for each subchannel in the OFDMA system is a maximum. In operation 547, the base station list and the relay station list created in operation 546 is transmitted to at least one base station in the OFDMA system.

Figure 6:
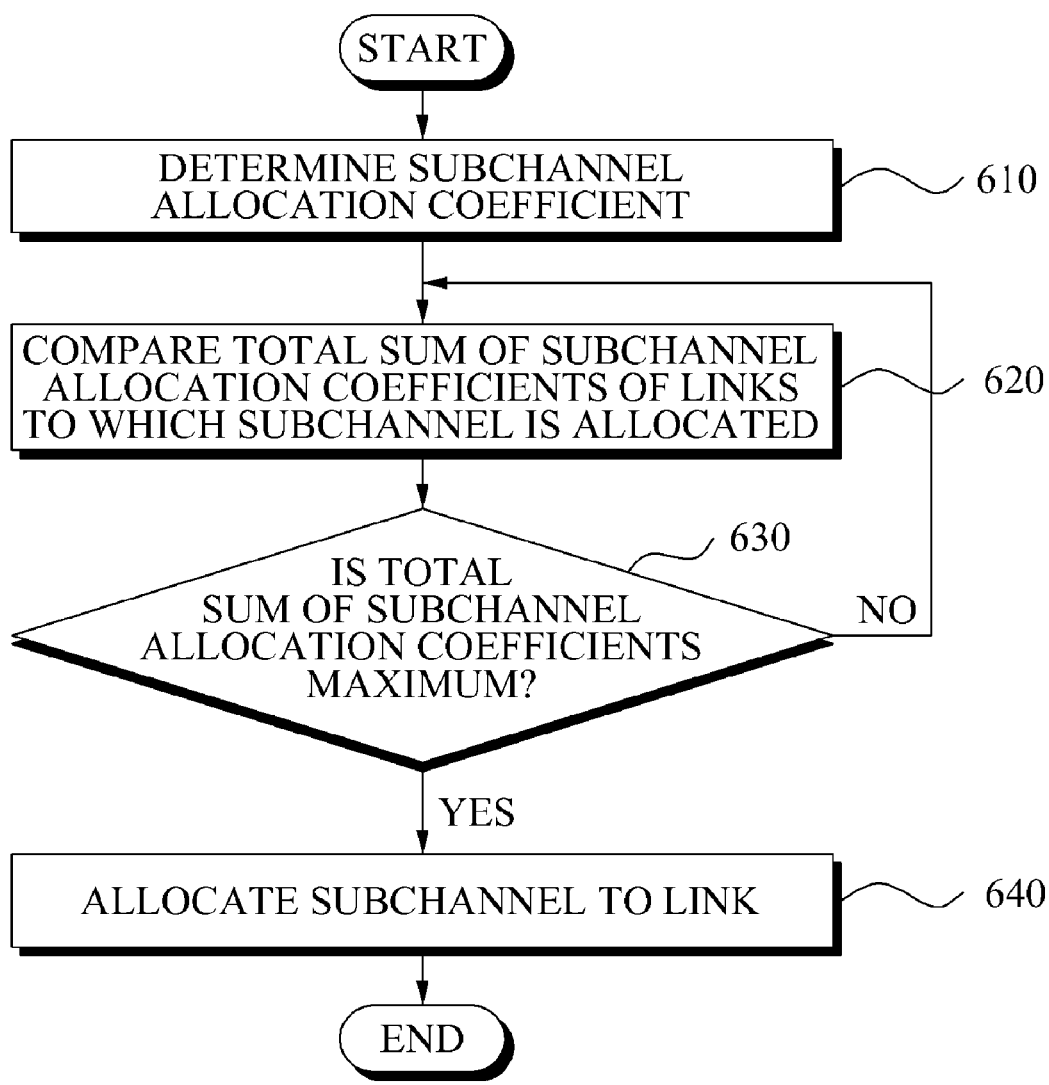
FIG. 6 is a flowchart illustrating an exemplary method of allocating subchannels.

FIG. 6 is a flowchart illustrating an exemplary method of allocating subchannels. In operation 610, a subchannel allocation coefficient is determined using a queue length of at least one terminal in the OFDMA system and an SINR of the at least one terminal and at least one relay station in the OFDMA system. In one implementation, the subchannel allocation coefficient may be determined using Equations 1 through 4.

In operation 620, a total sum of subchannel allocation coefficients of links, where a subchannel is allocated, is compared. In operation 630, whether the total sum of subchannel allocation coefficients is the maximum is determined as a result of the comparison in operation 620. In one implementation, operation 630 may be determined via Equations 5 through 6. As a result of the determination in operation 630, when the total sum of the subchannel allocation coefficients are not the maximums, operation flow returns to operation 620, and the comparison operation is repeated until a total sum of subchannel allocation coefficients is a maximum. As a result of the determination in operation 630, when a combination of a subchannel and a link whose total sum of subchannel allocation coefficients is a maximum is determined, a subchannel is allocated to a link to generate such combination in operation 640.

Figure 7:
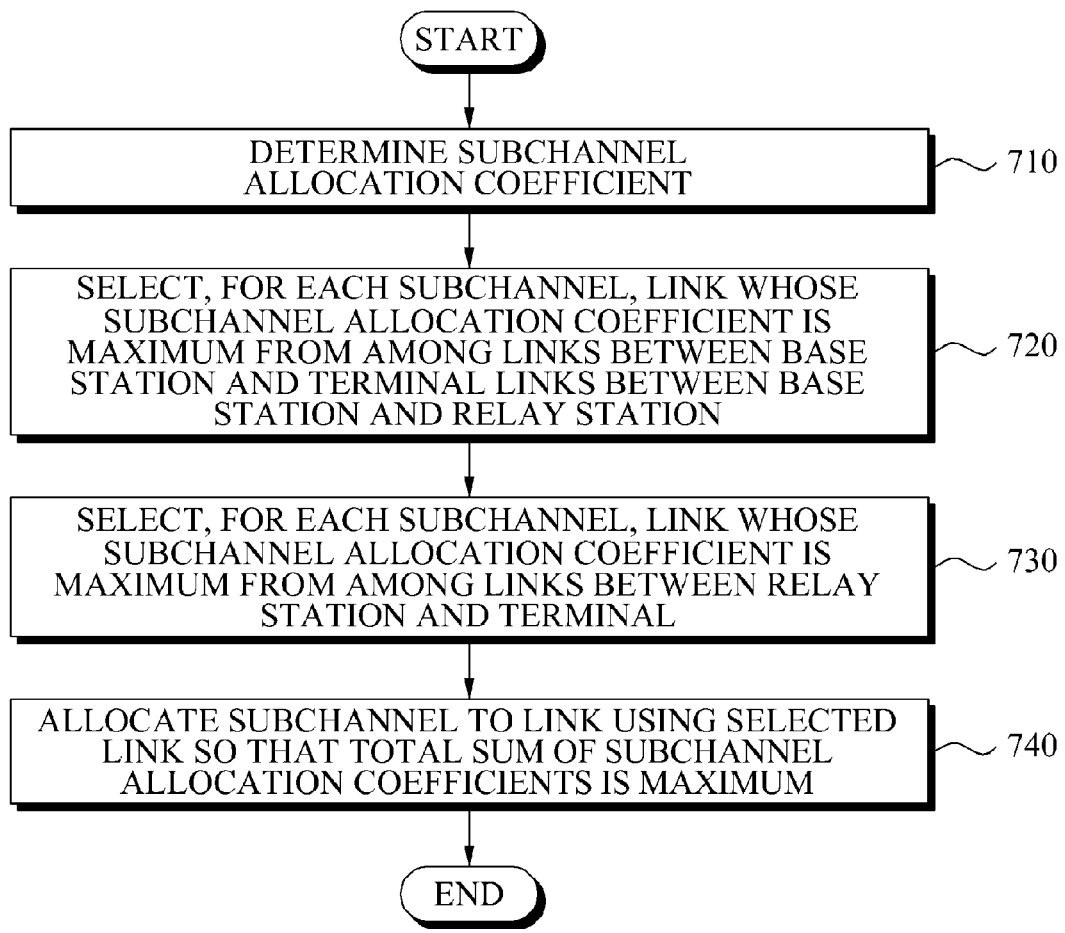
FIG. 7 is a flowchart illustrating an exemplary method of allocating subchannels.

FIG. 7 is a flowchart illustrating an exemplary method of allocating subchannels. In operation 710, a total sum of subchannel allocation coefficients of links where subchannel is allocated is compared. In operation 720, a link whose subchannel allocation coefficient is a maximum is selected for each subchannel, from among links between a base station and a terminal and between the base station and a relay station.

In one implementation, operation 720 may be selected using Equation 7. In operation 730, a link whose subchannel allocation coefficient is a maximum is selected for each subchannel, from among links between the relay station and the terminal. In one implementation, operation 730 may be selected via Equation 8. In operation 740, a subchannel is allocated to a link using links selected in operations 720 and 730 so that a total sum of subchannel allocation coefficients is a maximum.

Figure 8:
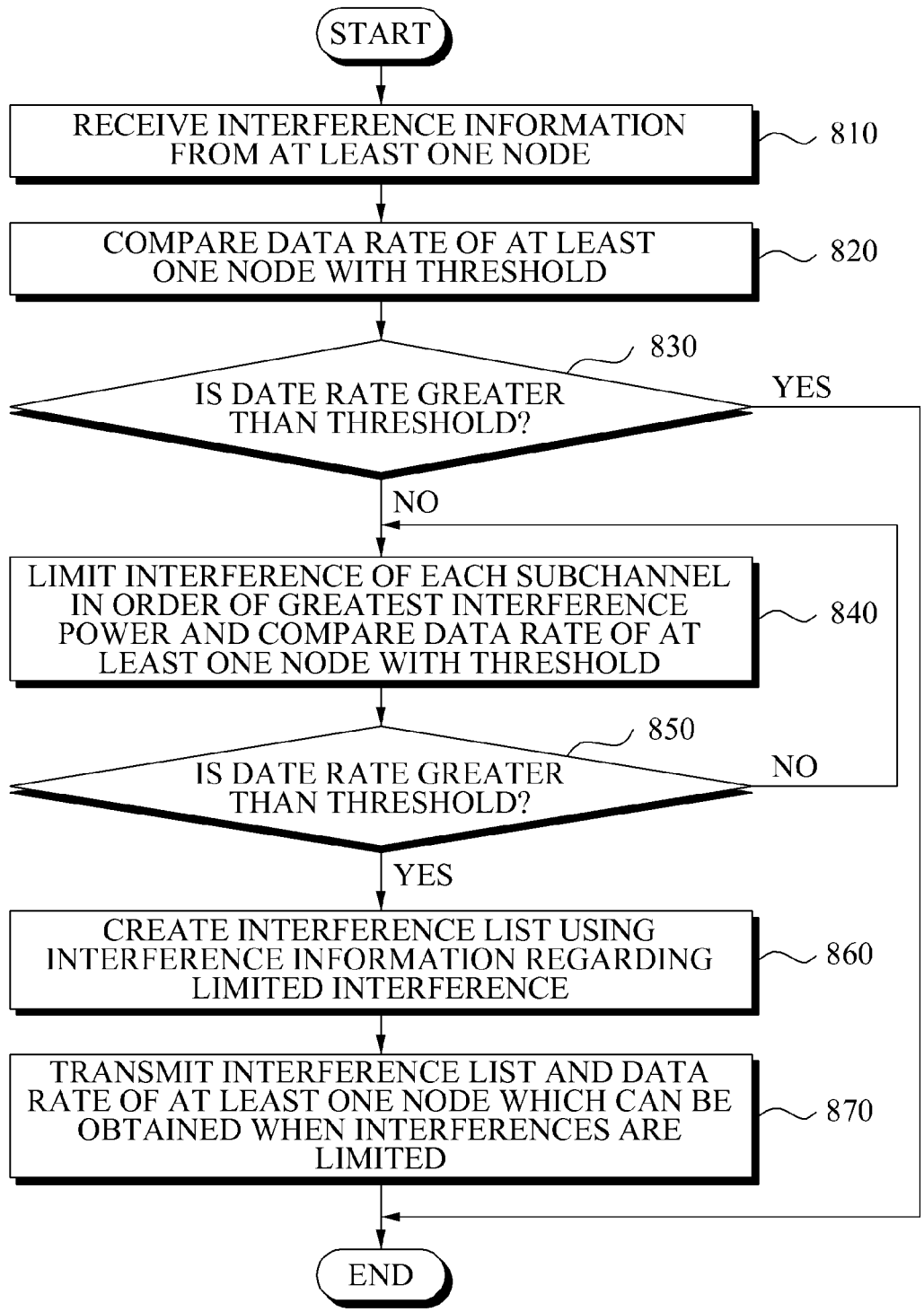
FIG. 8 is flowchart illustrating an exemplary method of controlling interference.

FIG. 8 is flowchart illustrating an exemplary method of controlling interference. In operation 810, interference information is received from at least one node in the OFDMA system. In one implementation, a predetermined number of the at least one node is generated in an order of greatest interference power, and the interference information may be transmitted. In operation 820, a data rate of the at least one node is compared with a threshold. In operation 830, whether the data rate of the at least one node is greater than the threshold is determined. In one implementation, the at least one node may be at least one terminal, and determining whether a data rate of at least one terminal is greater than the threshold is calculated using Equations 10 through 14.

In another example, the at least one node may be at least one relay station, and it may be determined whether a total sum of data rates of first hop of the at least one relay station is greater than the threshold. As a result of the determination in operation 830, when the data rate of the at least one node is greater than the threshold, the operation is terminated. However, as a result of the determination in operation 830, when the data rate of the at least one node is not greater than the threshold, interference is limited for each subchannel; allocated to the at least one node in an order of greatest interference power; and the data rate of the at least one node is compared with the threshold in operation 840.

In operation 850, whether the data rate of the at least one node which can be obtained by limiting the interference is greater than the threshold is determined. As a result of the determination in operation 850, when the data rate of the at least one node which can be obtained by limiting the interference is not greater than the threshold, operation 840 is repeated. However, as a result of the determination in operation 850, when the data rate of the at least one node which can be obtained by limiting the interference is greater than the threshold, an interference list is created using the interference information about the limited interference in operation 860. In operation 870, the interference list created in operation 860 and the data rate of the at least one node which can be obtained by limiting the interference are transmitted to a radio network controller.

For example, the radio network controller may create a base station list and a relay station list for each subchannel allocated to the OFDMA system via Equation 15, using the interference list and data rate transmitted from operation 870 and the controller may transmit the base station list and relay station list to at least one base station.

The method of allocating subchannels and for controlling interference in an OFDMA system as described above may be recorded in computer-readable media including program instructions to cause a processor to implement or carry out various operations embodied by a computer to form a specific machine or apparatus. A non-exhaustive list of examples of media may include, alone or in combination with the program instructions, at least data files, data structures, and the like. A non-exhaustive list of examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. A non-exhaustive list of examples of program instructions may include both steps, procedures, instructions embodied in machine code, such as produced by a compiler, and files containing higher level code that may be executed by the computer using an interpreter or other programming. Such hardware devices may be configured to act as one or more software modules in order to perform the exemplary method described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling interference, the apparatus comprising:
   an interference information receiving unit configured to receive interference information about at least one subchannel which is allocated to at least one node in an OFDMA system;
   a determination unit configured to determine that a data rate of the at least one node is less than a threshold based on the interference information about the at least one subchannel;
   an interference list creating unit configured to limit interference in the at least one subchannel until the data rate of the at least one node is greater than the threshold, and to create an interference list comprising the limited interference information; and
   a reporting unit configured to transmit the interference list comprising the limited interference information to a radio network controller (RNC),
   wherein the apparatus is included in a station controlled by the RNC, and
   the interference list transmitted to the RNC enables the RNC to create a base station list and a relay station list to limit data transmission for each subchannel allocated to the OFDMA system, and to transmit the base station list and relay station list to at least one base station in the OFDMA system.

2. The apparatus of claim 1, wherein the apparatus receives, from the at least one node, the interference information for controlling interference after the at least one node generates a predetermined number of interference information for each subchannel that is set in an order of greatest interference power.

3. The apparatus of claim 1, wherein the at least one node is at least one terminal in the OFDMA system, and the determination unit determines the threshold by estimating a total sum of actual data rates of the at least one terminal in a present frame using an actual data rate of the at least one terminal from a previous frame.

4. The apparatus of claim 1, wherein the at least one node is at least one relay station in the OFDMA system, and the determination unit determines whether a total sum of the data rates of a first hop of the at least one relay station is greater than the threshold.

5. The apparatus of claim 4, wherein the determination unit determines the sum of the data rates of a second hop of the at least one relay station to be the threshold.

6. The apparatus of claim 1, wherein the interference list creating unit limits the interference of each of the at least one subchannels in an order of greatest interference to least interference, determines again whether the data rate of the at least one node is greater than the threshold, and, in response to determining the data rate of the at least one node is not greater than the threshold, repeats the limiting and the determining.

7. The apparatus of claim 1, wherein the apparatus for controlling interference is included in the at least one base station in the OFDMA system.

8. The apparatus of claim 1, wherein the apparatus is included in a base station which is controlled by the RNC.

9. A method of an apparatus for controlling interference, the method comprising:
   receiving interference information about at least one subchannel which is allocated to at least one node, from the at least one node in an OFDMA system;
   determining that a data rate of the at least one node is less than a threshold based on the interference information about the at least one subchannel;
   limiting interference in the at least one subchannel until the data rate of the at least one node is greater than the threshold, and creating an interference list comprising the limited interference information; and
   transmitting the interference list to a radio network controller (RNC),
   wherein the apparatus is included in a station controlled by the RNC, and
   the interference list transmitted to the RNC enables the RNC to create a base station list and a relay station list to limit data transmission for each subchannel allocated to the OFDMA system, and to transmit the base station list and relay station list to at least one base station in the OFDMA system.

10. A non-transitory computer-readable storage medium storing a program to cause a processor to implement the method of claim 9.

11. A base station which is controlled by a radio network controller (RNC), the base station comprising:
   a determiner configured to determine that a data rate of a node is less than a predetermined threshold based on interference information about a plurality of subchannels allocated to the node;
   an interference list creator configured to limit interference in the plurality of subchannels until the data rate of the node is greater than the predetermined threshold, and to create an interference list comprising the limited interference information; and
   a transmitter configured to transmit the interference list comprising the limited interference information to the RNC,
   wherein the interference list transmitted to the RNC enables the RNC to create a base station list and a relay station list to limit data transmission for each subchannel allocated to the OFDMA system, and to transmit the base station list and relay station list to at least one other base station in the OFDMA system.

12. The base station of claim 11, wherein the interference list creator is configured to limit the interference in each subchannel from among the plurality of subchannels in an order from a subchannel comprising the greatest interference to a subchannel comprising the least interference.

13. The base station of claim 11, wherein the determiner and the interference list creator repeatedly perform the determining and the limiting, a plurality of times, until the data rate of the node is greater than the predetermined threshold.

14. The base station of claim 11, further comprising a receiver configured to receive a base station list and/or a relay station list from the RNC, and, in response to receiving the base station list and/or the relay station list, the interference list creator is configured to limit the interference in the plurality of subchannels.

* * * * *